W. PLANTIKO.
CATTLE STANCHION.
APPLICATION FILED MAY 6, 1916.
1,200,231.
Patented Oct. 3, 1916.
2 SHEETS—SHEET 1.
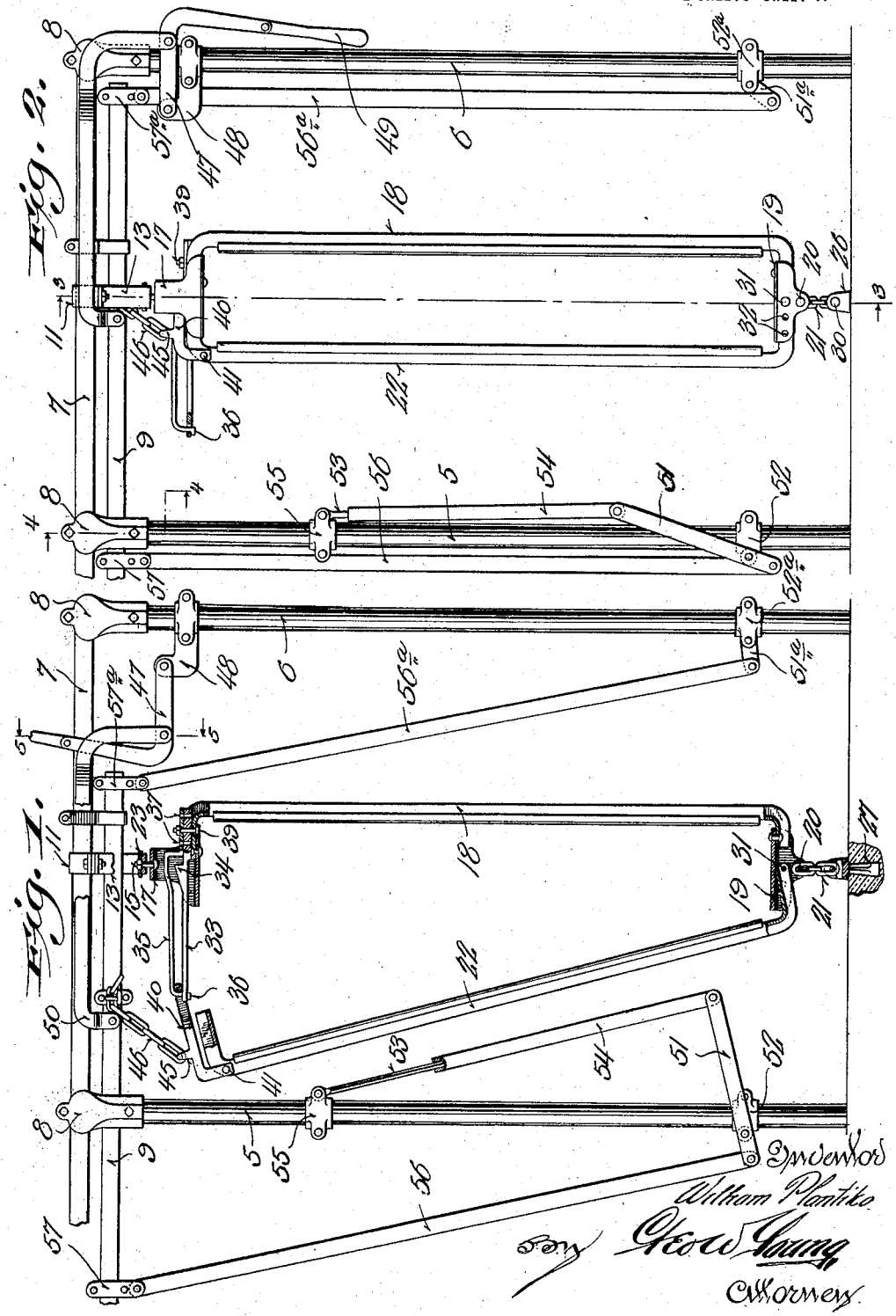

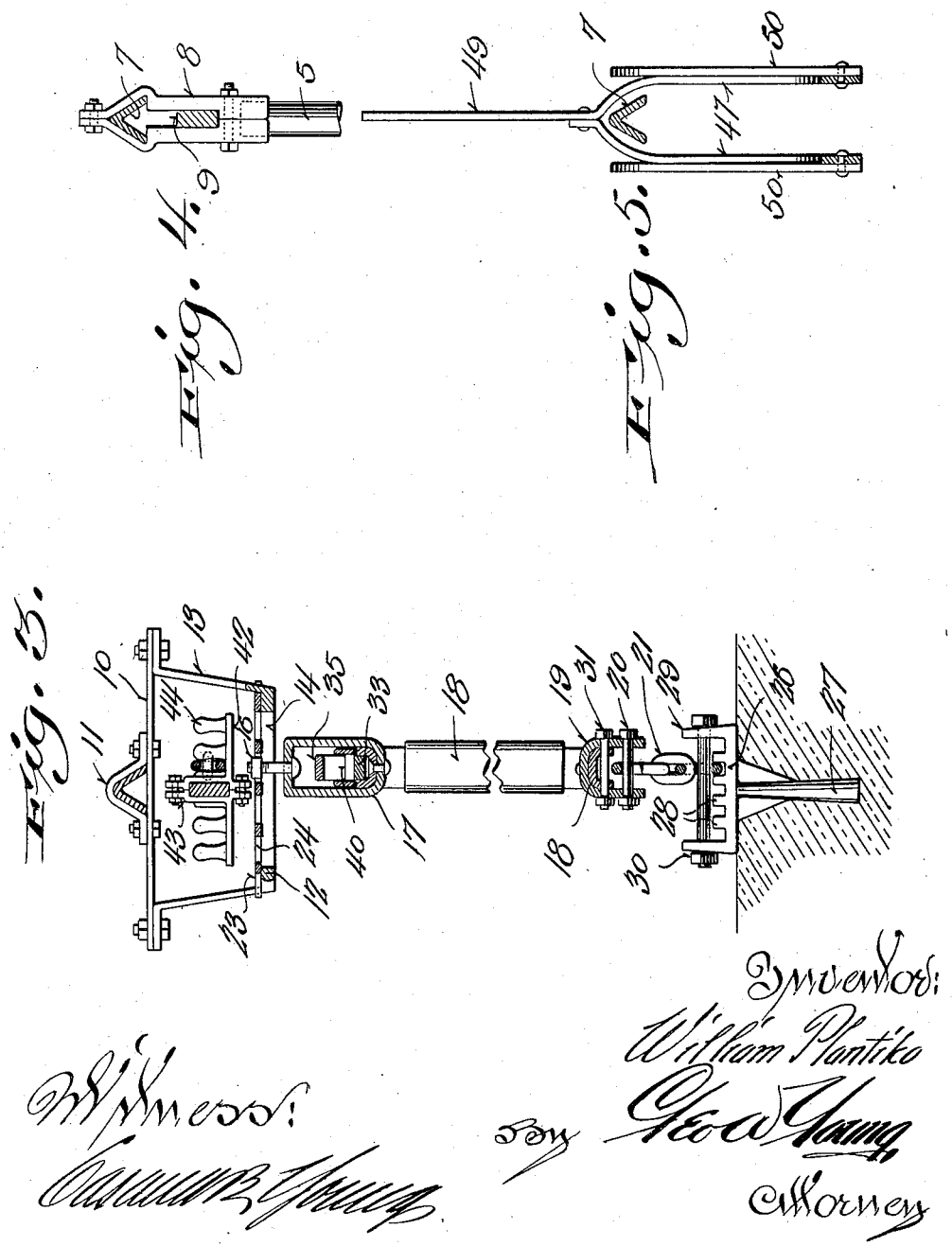

UNITED STATES PATENT OFFICE.

WILLIAM PLANTIKO, OF TWO RIVERS, WISCONSIN.

CATTLE-STANCHION.

1,200,231.   Specification of Letters Patent.   Patented Oct. 3, 1916.

Application filed May 6, 1916. Serial No. 95,752.

*To all whom it may concern:*

Be it known that I, WILLIAM PLANTIKO, a citizen of the United States, and resident of Two Rivers, in the county of Manitowoc and State of Wisconsin, have invented certain new and useful Improvements in Cattle-Stanchions; and I do hereby declare that the following is a full, clear, and exact description thereof.

The present invention relates to new and useful improvements in cattle stanchions more particularly of that type including a plurality of stanchions provided with a common means for actuating all of the stanchions to closing position, and wherein each of the stanchions is individually adjustable toward and away from the gutter of the stall, to properly aline a cow with respect to the trough.

It is in general the object of this present invention to simplify and otherwise improve the structure and to improve the efficiency and readiness of operation, particularly with respect to adjustment, of structures of this character.

It is more specifically an object to provide a means for adjusting individual stanchions toward and away from the trough in such manner as to not interfere with a desired pivotal mounting of the stanchion whereby a cow retained therein may be permitted a maximum degree of movement in turning its head from side to side, or with the means for actuating the stanchions to closing position.

Another important object of the invention resides in the provision of an improved stop bar mechanism to prevent insertion of a cow's head between the stall posts and the neck bars of the stanchion, which mechanism is actuated to a retracted position along the posts, when the stanchions are closed to permit free passage of a person between the stall posts, and to permit turning movement of the cow's head when confined in a stanchion.

With the above and other objects and advantages in view, the invention resides more particularly in the novel combination, arrangement and formation of parts more particularly hereinafter described and more particularly pointed out in the appended claims.

In the drawings: Figure 1 is an elevational view of the end stall and a portion of the adjacent stall in a series of stanchion stalls constructed in accordance with the present invention, and showing the stanchion in open position. Fig. 2 is a similar view with the stanchion closed. Fig. 3 is a vertical sectional view through the stanchion on the line 3—3 of Fig. 2. Fig. 4 is a detailed sectional view taken vertically through the upper end of one of the intermediate stall posts, as indicated by the line 4—4 of Fig. 2. Fig. 5 is a detailed sectional view through the operating lever of the stanchion closing means, as indicated by the line 5—5 of Fig. 1.

Referring now more particularly to the accompanying drawings, 5 and 6 designate respectively the inner and outer stall posts of the endmost of a series of stanchion stalls constructed in accordance with the present invention. Connecting the upper ends of all the stall posts is a top rail 7 which is formed preferably of angle iron with its angle portion disposed uppermost to provide a cross-section of substantially inverted V-shape and this top rail is secured to the posts by opposed head plates 8 having their lower ends coacting to form a socket receiving the stall posts and having their upper ends offset and then inclined together and secured to form substantially a triangular opening receiving the top rail 7. The intermediate portions of these bars are spaced apart to form guide passages slidably receiving a closing bar 9 extending along the top portion of the series of stanchions.

Inasmuch as all the stanchions proper are similar in structure, only the end stanchion structure is shown in full. This stanchion structure comprises a head frame for securing the upper ends of the neck bars formed of a bar 10 disposed transversely under the central portion of the top rail 7 and secured thereto by a yoke strap 11, and disposed under this bar 10 is the lower bar 12 of the frame having its ends directed upwardly at 13 and secured to the top bar. This lower bar 12 is provided with a longitudinal slot 14 through which is passed a bolt 15 held in the slot by a nut 16 threaded on its upper end and this bolt is passed through the reduced upper portion of a horizontally extending open end casing 17.

The upper end of the stationary neck bar 18 is laterally directed to extend into the casing and fixedly secured thereto, and the lower end of the stationary neck bar is laterally directed to extend into a channel bottom plate 19 and fixedly secured thereto, the side portions of this channel plate being extended downwardly to mount a bolt 20 to which is secured the upper end of a chain section 21. The swinging neck bar 22 is connected with the channel plate 19 and the casing 17 and thus adjustment of the plate and casing transversely of the line of stalls will adjust the entire stanchion to provide for a proper alinement of the cow with the gutter or trough at the rear of the stall. To procure this adjustment in connection with the casing 17, a holding bar 23 is provided which has its ends furcated to embrace the end bar portions 13 of the head frame whereby the plate is mounted for vertical sliding movement in the frame and this plate is provided with a series of apertures 24 adapted to selectively receive the nut 16. Thus by lifting the plate and sliding the bolt 15 which carries the upper portion of the stanchion to a position alining with a certain aperture 24, this upper portion of the stanchion may be adjusted. The lower portion of the stanchion is secured in a manner permitting corresponding adjustment by means of a transverse bar 26 carried by an anchor post 27 embedded in the cement base of the stall and this bar is provided with a series of spaced upstanding projections 28, defining recesses adapted to selectively receive the bottom link of the chain section 21, the ends of the bar being provided with relatively higher projections 29 through which and through the said bottom link is passed a securing bolt 30. Thus upon removing the bolt, the link may be positioned selectively in one of the recesses and the bolt inserted to retain the link therein, and to consequently hold the lower portion of the stanchion in desired adjusted position.

The lower end of the swinging neck bar 22 is laterally directed to extend within the channel plate 19, and is adjustably secured thereto by a bolt 31 passed through said end of the neck bar and selectively passed through pairs of apertures 32 in the walls of the channel plate. The upper end of the swinging neck bar is inwardly directed to engage in the lower portion of the casing 17, and to provide a holding member for slidably holding this upper end with respect to the casing, and for locking this other end in inward or closing position, a loop projects from that side of the casing adjacent the swinging neck bar. This loop comprises a bottom rod 33 having an upward tooth projection 34 on its end within the casing, and an upper bar 35 having its outer end bent laterally to extend through the outer end of the bar 33 and provided at its extremity with an outward extension 36 which serves to lock the bars together when they are disposed in substantially parallel relation. The inner end of the bar 35 is upwardly offset to extend substantially in parallel relation to the faces of the tooth projection 34, and the ends of both bars 33 and 35 adjacent the casing are provided with series of alined apertures 37 through a selective one of which and through the casing and the inwardly directed end of the stationary neck bar is passed a securing bolt 39. This bolt 39 thus holds the bars in a position forming a guide loop and this guide loop may be adjusted laterally of the stall to correspond with the described adjustment procurable at the lower end of the swinging neck bar, whereby the stanchion may be adjusted to accommodate cows having necks of differing thickness. The swinging neck bar 22 is connected with the loop by a U-shaped pawl member 40 having its bight reduced and disposed in the loop and having the free ends of its arms laterally directed and pivoted at 41 to the upper end of the neck bars at its angle, the pawl being thus held spaced above the inwardly turned end of the neck bar so that the lower bar 33 of the loop may slide therebetween. The outer face of the tooth projection 34 of the loop bar 33 is inclined, and its inner face is at right angles to the bar and thus upon swinging the neck bar inwardly the bight of the pawl will lockingly engage with this tooth projection to thus hold the stanchion in closed position. Inasmuch as the entire loop is adjustable away from the stationary neck bar, it is apparent that the closing position of the movable neck bar is correspondingly adjusted. The stanchion is thus fully and readily adjustable both with respect to its width and with respect to its position relative to the stall gutter, to provide a connection between the common closing bar 9 and the swinging neck bar which is adjustable to compensate for the said adjustments of the stanchion, and which will not interfere with desired pivotal movements of the stanchion. Oppositely projected arms 42 extend laterally from the closing bar at a point which is in vertical alinement with the axis of the stanchion when the bar is in closing position, these arms being secured to the bar by clamp portions 43 at their ends thereadjacent, and these arms are provided with spaced upwardly extending bosses 44 which define in conjunction with the upwardly projected clamp portions a transverse series of recesses corresponding to the apertures 24 of the holding plate of the stanchion head frame.

Secured to a connecting arm 45 which connects the free end portions of the arms of the U-shaped bar 40, and which incidentally strengthens the pawl, is the end link of a chain section 46 and this chain section is adapted to engage selectively in one of the recesses formed by the bosses 44, the sides of the bosses being preferably concaved to assist in retention of the chain section. Selective engagement of respective chain links in a certain recess procures adjustment compensating for adjustment of the width of the stanchion and engagement of a certain link selectively in the recess procures an adjustment compensating for the adjustment of the stanchion toward and away from the stall gutter.

It will be noted that when the stanchion is closed the bolt 15 and the chain 21 which form the attaching means of the upper and lower portions respectively of the stall and the connection of the chain 46 are all in vertical alinement, and thus the entire stanchion may swing around a vertical axis to permit a maximum movement of the cow's head.

For actuating the closing bar 9, an angular lever is provided which comprises a pair of angular bars 47 having adjacent ends pivoted to a bracket 48 carried by the upper portion of the outer stall post 6. The other arm of one of the bars extends past the free end of the adjacent arm of the other bar to form a handle 49 and the free end of the said other bar and the intermediate portion of the longer bar are directed together and secured. Thus a lever is procured having its major portion bifurcated and this bifurcated portion straddles the top rail 7. Secured to the angular portions of the lever bars are the downward turned ends of links 50 and these links are oppositely bowed to extend past the head frame of the stanchion and have their other ends also downwardly directed and pivotally secured to the closing bar 9 outwardly of the arms 42 with respect to the head frame.

As more particularly shown in Fig. 1, the lever is disposed with its handle extending upwardly and the connecting portions of the bars 47 seating on the top rail 7 when the closing bar is in a retracted position. To actuate the bar to closing position the lever is swung outwardly with respect to the stall to a position wherein its handle lies downwardly along the stall post 6. To provide a stop bar structure effectually closing the spaces between the neck bars and the stall posts when the stanchion is open and which swings to lie along the post to provide clearance between the post and neck bars when the stanchion is closed, a lever 51 is pivotally secured adjacent one end to a bracket 52 carried by the lower portion of each intermediate stall post 5, the longer end of this link extending toward a respective swinging neck bar. Pivoted to the extremity of this longer end of the link is a stop bar comprising telescopic upper and lower sections 53 and 54 respectively, the upper section being pivotally connected to a bracket 55 carried by the upper portion of the stanchion post 5. Pivoted to the short end of the lever 51 is the lower end of a stop bar 56 having its upper end pivoted to a clip 57 carried by the closing bar 9 and so positioned thereon that when the closing bar is in retracted position the clip will hold the stop bar at an acute angle to the stall post whereby the stop bar projects diagonally across the space between the stall posts of the adjacent neck bar 18. Upon movement of the closing bar to operative position, it is seen that the stop bar 56 will be swung inwardly and that this inward swinging will consequently swing the lever 51, and by reason of relatively great leverage procured by the pivotal mounting thereof, will telescope the stop bar comprising the sections 53 and 54 whereupon both the stop bars and the lever will lie along the respective stall posts to provide clearance between the stall post and the adjacent neck bars. In connection with the outermost stall post, a stop bar 56$^a$ is provided which is pivotally connected in turn with a bracket 52$^a$, and the upper end of the stop bar is secured to a clip 57$^a$, this structure being the same as the structure heretofore described with the exception that the stop bar structure at the side of the post opposite the stop bar 56$^a$ is eliminated. Actuation of the closing bar 9, will thus simultaneously close all of the stanchions and will retract the stop bar structure.

I claim:

1. A stanchion comprising a stationary neck bar, a swinging neck bar, a member adjustably connecting the upper ends of the neck bars, a member adjustably connecting the lower ends of the neck bars, a slidable closing bar, said connecting members being adjustable transversely of the closing bar and a connection between the swinging neck bar and the closing bar adjustable to correspond to adjustment of the neck bar with respect to the connecting members, said connection being further adjustable to correspond to adjustment of the connecting members transversely of the closing bar.

2. A stanchion comprising a stationary neck bar, a swinging neck bar, a member connecting the upper ends of the neck bars, a member connecting the lower ends of the neck bars, a slidable closing bar, means for adjusting the connecting members transversely of the closing bar, a transverse arm carried by the closing bar, projections on said arm defining recesses therebetween, and a connecting member secured to the swinging neck bar and adapted for selective interlocking engagement in said recesses.

3. A stanchion comprising a stationary neck bar, a swinging neck bar, a member adjustably connecting the upper ends of the neck bars, a member adjustably connecting the lower ends of the neck bars, a slidable closing bar, a pair of projections on the closing bar and a chain secured to the swinging neck bar and having its links adapted to selectively interlockingly engage between said projections.

4. A stanchion comprising a stationary neck bar, a swinging neck bar, a member adjustably connecting the upper ends of the neck bars, a member adjustably connecting the lower ends of the neck bars, a slidable closing bar, said connecting members being adjustable transversely of the closing bar, a lateral extension on the closing bar, projections on said extension defining recesses therebetween, and a chain section connected with the swinging neck bar and having selective links selectively engageable in said recesses.

5. A stanchion comprising a stationary neck bar, a swinging neck bar, means connecting the lower ends of the neck bars, means connecting the upper ends of the neck bars including a body member and a tooth carrying loop and a pawl pivoted to the swinging neck bar and slidably mounted in the loop, the lower end of the swinging neck bar being adjustable with respect to the lower connecting member, and the loop being adjustable with respect to the said body member.

6. In a stanchion, a stationary neck bar, a swinging neck bar, an anchor member, a member connecting the lower ends of the neck bars, and horizontally adjustably secured to the anchor member, a member connecting the upper ends of the neck bars, a head frame including a bottom plate provided with a longitudinal slot and upstanding end bar portions, a bolt passed through the upper connecting member and through the said slot, a head on the bolt above the slot, and a holding plate slidably carried by the head frame and provided with a series of apertures adapted to selectively receive the head of the bolt.

7. A stanchion comprising a stationary neck bar, a swinging neck bar, means connecting the lower ends of the neck bars, means connecting the upper ends of the neck bars including a body member and a tooth carrying loop and a U-shaped pawl having its bight disposed in the loop and the outer ends of its arms pivoted to the swinging neck bar.

8. In a stanchion the combination with a stationary neck bar, a swinging neck bar, a slidable closing bar connected with the swinging bar for closing the same, a stall post, a lever pivoted adjacent one end to the stall post, a stop bar pivoted to the arm of the lever and to the closing bar, and a second stop bar pivoted to the other arm of the lever and to the stall post and comprising a pair of slidably connected sections.

9. An end stanchion structure comprising stall posts, a top rail connecting the stall posts, a stationary neck bar connected with the top rail, a swinging neck bar connected with the top rail, a slidable closing bar connected with the swinging neck bar, an operating lever for the closing bar having its inner portion bifurcated to embrace the top rail, and angularly bent and pivoted to one of the stall posts, and links pivoted to the furcations of the lever and embracing the connections of the neck bars and pivoted to the closing bar.

In testimony that I claim the foregoing I have hereunto set my hand at Two Rivers, in the county of Manitowoc and State of Wisconsin, in the presence of two witnesses.

WILLIAM PLANTIKO.

Witnesses:
ROLAND C. BLESER,
H. R. SCHWAKE.